United States Patent [19]
Garcia et al.

[11] Patent Number: 5,357,569
[45] Date of Patent: Oct. 18, 1994

[54] TRANS-HYBRID LOSS COMPENSATOR FOR ON HOOK TRANSMISSION

[75] Inventors: Frank X. Garcia; Bruce R. Miller, both of Aurora, Ill.

[73] Assignee: Teltrend Inc., St. Charles, Ill.

[21] Appl. No.: 56,413

[22] Filed: May 3, 1993

[51] Int. Cl.⁵ .................................................. H04M 1/00
[52] U.S. Cl. ..................... 379/399; 379/402; 379/406; 379/410
[58] Field of Search ............... 379/399, 402, 406, 410, 379/338, 344, 345

[56] References Cited
U.S. PATENT DOCUMENTS

| | | | |
|---|---|---|---|
| 3,936,602 | 2/1976 | Korver | 178/58 R |
| 4,192,007 | 3/1980 | Becker et al. | 364/721 |
| 4,315,107 | 2/1982 | Ciesielka et al. | 179/16 F |
| 4,331,843 | 5/1982 | Tarr et al. | 179/175.2 |
| 4,377,730 | 3/1983 | Gay et al. | 379/410 |
| 4,489,222 | 12/1984 | Lusignan et al. | 177/170.2 |
| 4,787,080 | 11/1988 | Yamakido et al. | 370/32.1 |
| 5,034,978 | 7/1991 | Nguyen et al. | 379/402 |
| 5,133,006 | 7/1992 | Khuat | 379/399 |
| 5,151,936 | 9/1992 | Riedle | 379/402 |
| 5,172,411 | 12/1992 | Gazsi | 379/402 |
| 5,175,763 | 12/1992 | Gazsi | 379/402 |
| 5,175,764 | 12/1992 | Patel et al. | 379/399 |
| 5,253,291 | 10/1993 | Naseer et al. | 379/399 |

FOREIGN PATENT DOCUMENTS 0503528  9/1992  European Pat. Off. ............. 379/399

OTHER PUBLICATIONS

Brochure excerpt, 8-Bit Embedded Controller Handbook, Intel Corporation, 1991.
Brochure excerpt, Data Book-Microcontroller, Fifth Edition, OKI Semiconductor, Jun. 1990.
Brochure excerpt, Integrated Circuits Data Handbook-80C51-Based 8-Bit Microcontrollers, Signetics Company-Philips Semiconductors, Feb. 1992.
Brochure excerpt, Telecommunications Databook, National Semiconductor Corporation, 1992 Edition.

*Primary Examiner*—James L. Dwyer
*Assistant Examiner*—M. W. Shehata
*Attorney, Agent, or Firm*—Allegretti & Witcoff, Ltd.

[57] ABSTRACT

A two to four wire hybrid converter for use in a telephone system that allows other telephone equipment, such as a caller identification device, to more readily decipher signals. The converter controls noise by using a digital to analog converter, hybrid circuit, interface circuit, and controller. The digital to analog converter accepts a receive digital data signal from a transmission line and converts it to a receive analog signal. The hybrid circuit accepts the receive analog signal and provides it to the customer telephone line, as well as accepting a transmit telephone analog signal from the customer telephone line. Such transmit telephone analog signals are then converted to digital signals and provided to the carrier transmission lines. The hybrid circuit includes an inverter, variable amplifiers, and summing circuit. The inverter inverts the transmit telephone analog signal with respect to the receive analog signal. In the preferred embodiment, the summing circuit combines the inverted transmit and receive analog signals. A transmit variable amplifier changes the magnitude of the transmit analog signal provided to the summing circuit. A receive variable amplifier changes the magnitude of the analog signal provided to the customer telephone line. A trans-hybrid variable amplifier changes the magnitude of the receive analog signal to be combined with the inverted transmit analog signal. The controller detects whether or not the telephone has gone off hook. Upon receiving a signal that the telephone has gone off hook, the controller changes the gain of the variable amplifiers.

5 Claims, 2 Drawing Sheets

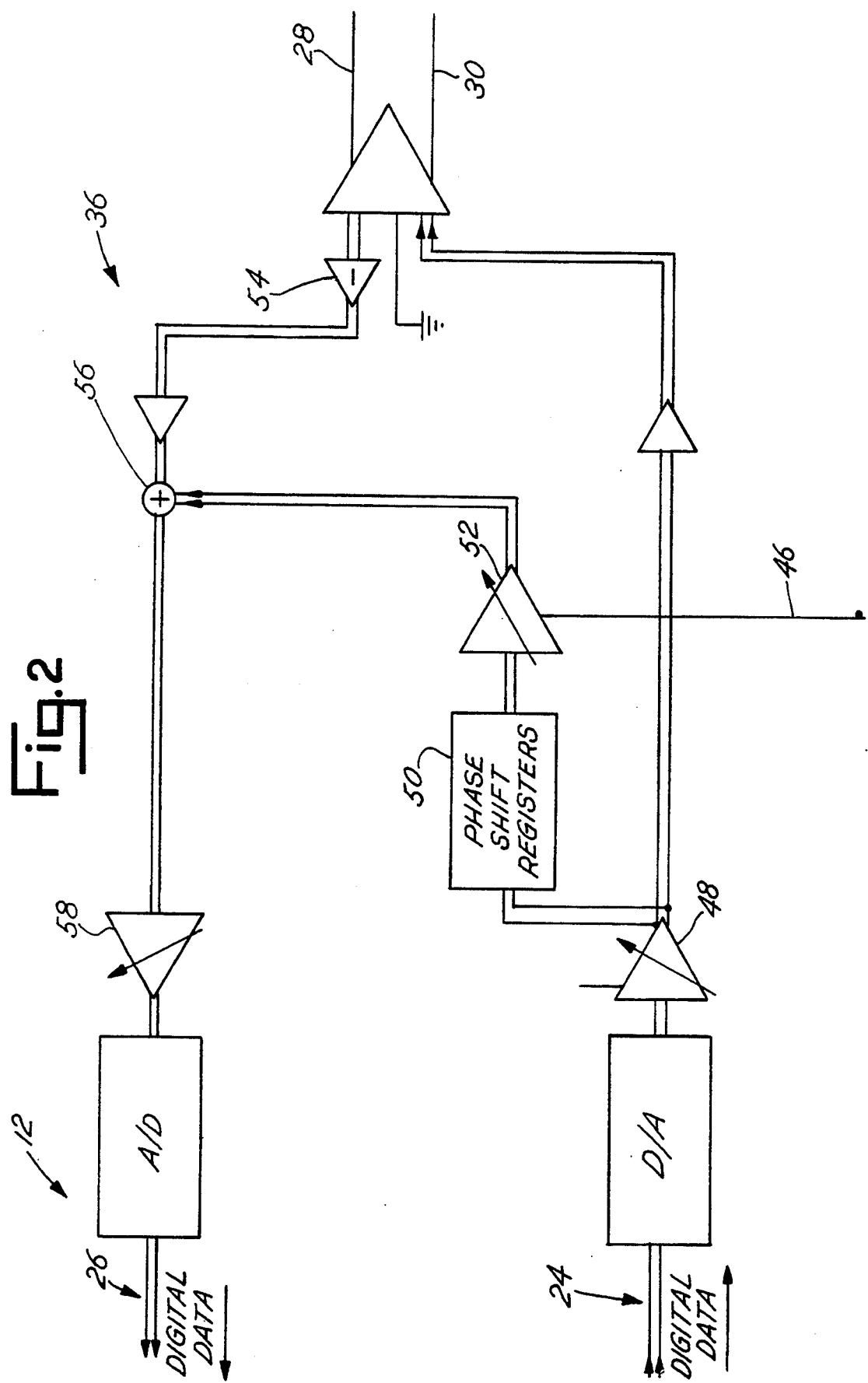

TRANS-HYBRID LOSS COMPENSATOR FOR ON HOOK TRANSMISSION

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention relates generally to a loss compensation circuits in telecommunication transmission facilities and, more particular, to a trans-hybrid loss compensation circuit which varies between various modes of operation depending on whether an associated telephone is on hook or off hook.

The Bell telephone system in the United States, for example, has widely utilized digital "D" multiplexing code modulation systems. A "D" channel bank, for example, commonly provides multiple DS-1 signals that are carried on a T-1 transmission system. One pair of cables is provided for each direction of transmission.

The facilities generally include the central office switch, which provides an analog signal to a central office channel unit. The central office channel unit converts the two wire analog signal to a digital data signal transmitted on two pairs of cables. The digital data signals are transmitted to a remote transmission channel unit. The digital data signal is then reconverted to an analog signal and provided, in analog form, on two a wire conductor, or Tip-Ring pair, to the customer's premises.

Signals which are sent via digital carrier transmission lines from the central office reach a remote terminal unit before reaching the customer premises. The remote terminal then converts the digital signal to an analog signal, which may then be an intelligible signal for the telephone. Thus, in the remote terminal, the digital data signals, sent over the T-1 lines, are converted to analog telephone signals and then supplied to a customer loop telephone line. The analog telephone signals may then be received by the customer premises, which may include telephones and, in some cases, PBX units. Conversely, the remote terminals receive analog telephone signals from the telephones and PBX units and convert them to digital data signals, which then can be transmitted over the T-1 transmission system.

The customer's premises may include a telephone and a caller identification box which deciphers information sent by the central office regarding the telephone number of the party originating the call. Such information is normally found in the signal provided to the customer's telephone after the first ring of the telephone.

Many transmission lines include a hybrid circuit that interfaces a two-wire transmit transmission line and a two-wire receive transmission line (a four-wire circuit) to a the Tip-Ring pair. Part of the signal on the receive transmission line may be reflected back to the transmit transmission line. This, in turn, may be reflected back along the receive transmission line, resulting in substantial "noise" in the transmission line system. A common practice is to invert the received signal and add it to any transmit signal received from the telephone lines (to effectively cancel out "reflected" signals). The level of the transmitted signal is compared to the receive signal and represented in dB: dB=20 Log (Transit Voltage/Receive Voltage). Such measures are not always effective in eliminating reflected signals.

Some customer premises equipment, such as a caller identification boxes, are sensitive to "reflected noise." For example, caller identification boxes generally receive information between the first and second rings on a telephone. Reflected noise in the transmission line system may interfere with a caller identification box's ability to correctly interpret information transmitted over the telephone lines between rings.

SUMMARY OF THE INVENTION

In a principal aspect, the present invention relates to a hybrid converter for use with a digital transmission line system. The system includes a customer loop telephone line interconnected to a telephone and a digital carrier transmission line.

The hybrid converter includes an inverter, summing circuit, a variable amplifier, an interface, and a processor. The inverter inverts a receive transmission signal relative to an analog transmit (outgoing) telephone signal. The amplifier variably adjusts the receive transmission signal. The summing circuit accepts an analog transmit telephone signal and the inverted signal and provides a combined signal to the transmit transmission line.

The interface circuit detects the direct current of the telephone line and, thus, is able to provide an off-hook signal when the direct current increases and the telephone has gone off hook. The microprocessor is interconnected to both the interface circuit and the amplifier. When receiving a signal indicating that the telephone has gone off hook, the microprocessor shifts the amplification of the variable amplifier to a lower level.

Thus, an object of the present invention is an improved hybrid converter which has automatic loss compensation for on hook transmission. Yet a further object is a hybrid converter that is more reliable and less costly to manufacture and operate. These and other objects, features, and advantages of the present invention are discussed or are apparent in the following detailed description.

BRIEF DESCRIPTION OF THE DRAWINGS

A preferred embodiment of the present invention is described herein with reference to the drawings wherein:

FIG. 2 is a more detailed block diagram of the hybrid converter shown in FIG. 1.

DETAILED DESCRIPTION OF THE PREFERRED EMBODIMENT

Figure 1:
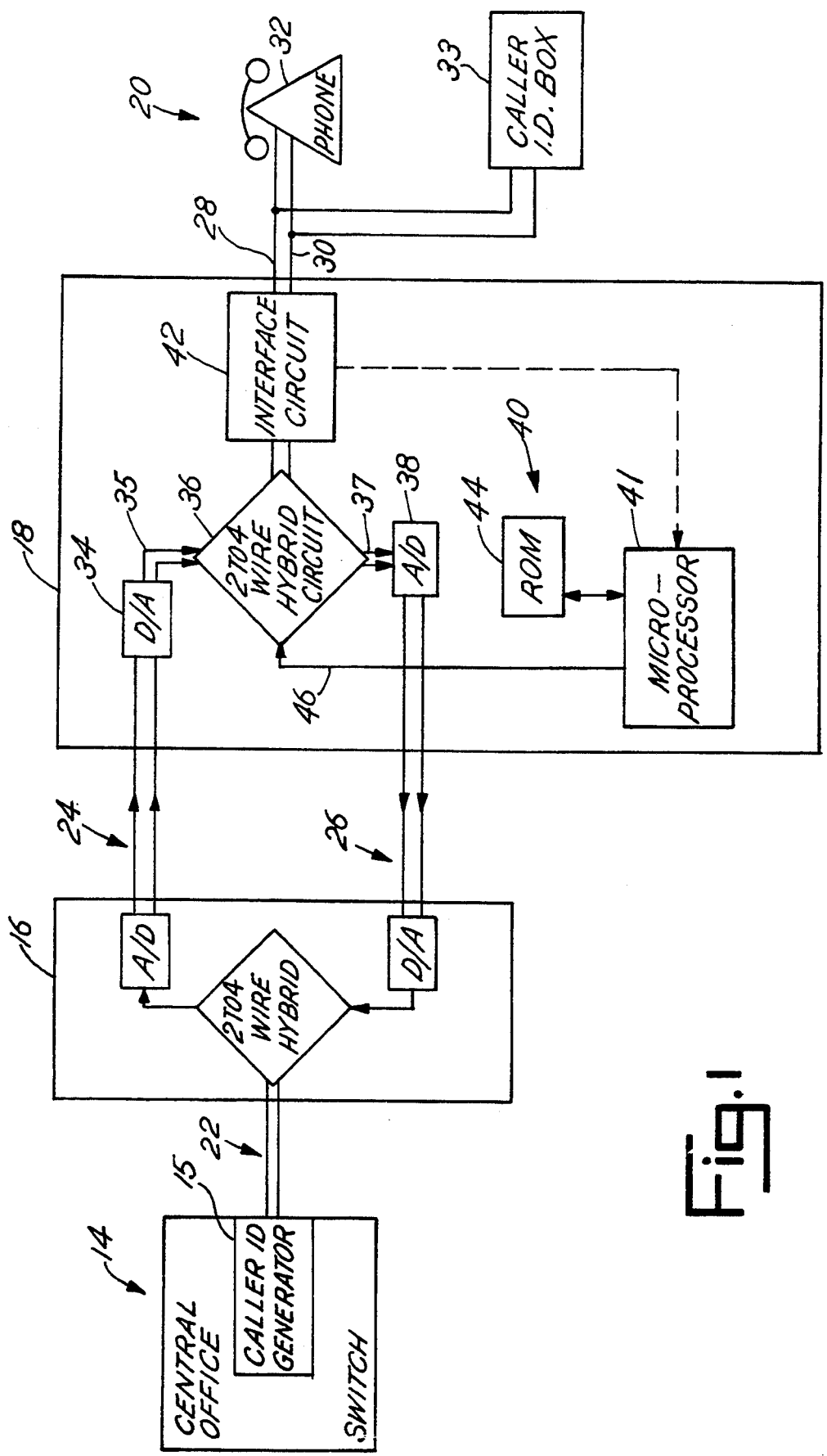
FIG. 1 is a block diagram showing a preferred embodiment of the present invention.

Referring to FIGS. 1 and 2, the preferred embodiment of the present invention is shown as a hybrid converter, having automatic loss compensation for on hook transmission 10 for use with digital telecommunication transmission facilities 12. Such facilities 12 include a central office switch 14, central office channel unit 16, remote terminal channel unit 18, and customer premises 20.

The central office switch 14 and channel unit 16 are interconnected with a two-wire, analog span 22. The central office channel unit 16 is interconnected to the remote channel unit 18 via a pair of receive transmission lines 24 and a pair of transmit transmission lines 26. The remote terminal channel unit 18 and customer premises 20 are interconnected with a two-wire analog line, or Tip-Ring Pair, 28, 30. The customer premises includes a telephone 32 and may include other equipment, such as a caller identification box 33.

The remote terminal channel unit 18 includes a digital to analog converter 34, a four-wire to two-wire hybrid circuit 36, an analog to digital converter 38, a controller 40, and an interface circuit 42. A receive cable pair 35 interconnects the digital to analog converter 34 to the hybrid circuit 36 and a transmit cable pair 37 interconnects the hybrid circuit 36 to the analog to digital converter 38. The controller 40 provides signals to the hybrid circuit 36 via receive a lead 46.

In operation, the central office switch 14 transmits an analog signal to the office channel unit 16. The channel unit 16 then converts the analog signal from the central office 14 to a digital data signal. It communicates with the remote channel unit 18 via the pair of transmit transmission lines 26 and the pair of receive transmission lines 24.

The digital to analog converter 34 converts the digital data signal received over the receive transmission lines 24 to an analog signal. The hybrid converter 36 transmits the signal to the telephone lines 28, 30. Further, transmit telephone signals from the telephone lines 28, 30 are transmitted to the analog to digital converter 38 and, thereafter, transmitted to the transmit transmission lines 26.

Any signals from the telephone, or any reflected signal from the caller identification box 33, are then transmitted back through the hybrid circuit 36, and converted to a digital signal by the analog to digital converter 38.

The controller 40 includes a microprocessor 42 and a Read Only Memory 44. In the preferred embodiment, the microprocessor 42 is a 875 1 BH chip manufactured by, for example, Intel, Signetics, and OKI. The microprocessor 42 is interconnected to the hybrid circuit 36 via a control lead 46.

The interface circuit 42 interconnects the hybrid circuit 36 with the telephone lines 28, 30. The interface circuit 42 monitors the current along the telephone lines 28, 30. When the telephone 32 goes off hook, the current increases, and the interface circuit 42 sends a call initiation signal to the microprocessor 41.

The interface circuit 42 measures the direct current on the telephone lines 28, 30 and, thus, may provide an off hook signal when the telephone 32 is taken off hook. The microprocessor 41 receives the off hook or call initiation signal and then provides an amplification adjustment signal to the two to four wire hybrid circuit 36.

As shown in FIG. 2, the hybrid circuit 36 includes a receive grain register or receive amplifier 48, phase shift registers 50, programmable trans-hybrid attenuator register 52, inverter 54, summing circuit or adder 56, and a transmit gain register or programmable transmit amplifier 58.

The inverter 54 inverts an analog telephone signal to be sent out over the facilities system 12. The inverted output from the telephone lines 28, 30 and the non-inverted output of the amplifiers 48, 52 are then combined by the summing circuit or adder 56. The resultant summed signal is then supplied to the programmable transmit amplifier 58.

The amplifier 52 may supply either high or low amplified, or altered, signals, which are then transmitted toward the central office 14 via the transmit transmission lines 26. The amount of amplification varies with the level of the control signal supplied to the amplifier by the microprocessor 41. The gain of the amplifiers 48, 58 may also be changed by the controller 40.

The microprocessor 41 increases the gain of the amplifier 52 to maximum when the telephone 32 is on hook and to a lower moderate level when the telephone 32 is off hook.

The microprocessor 41 may also receive from the interface circuit 42 an indication of the length (or resistance) of the telephone line (Tip-Ring pair) between the interface circuit 42 and the telephone 32. The higher gain effected by the microprocessor 41 in the amplifier 58 is shown by the following tables.

| Length of telephone line span in feet | Gain in dB |
| --- | --- |
| 0–3000 | 05 (Hex) rather than A5 (Hex) |
| 3000–6000 | 05 (Hex) rather than 25 (Hex) |
| 6000–9000 | 05 (Hex) rather than C5 (Hex) |
| 9000–12000 | 05 (Hex) rather than 45 (Hex) |

The amplification of the inverted signal in the hybrid circuit is at a higher level when the telephone 32 is on hook and at a lower level when the telephone 32 is off hook. In this way, noise is substantially reduced along the line when the telephone 32 is not in use. In this way, the caller identification box 33 may, for example, more readily understand information found, for example, between the first and second rings (before the telephone 32 goes off hook). Generally, the caller identification box 33 receives data representing the caller's number during this time.

A source code listing of the program used by the microprocessor 41 to effect the change in amplification, in the C language, follows.

```c
/**********************************************************************/
/*                      COPYRIGHT 1991                                */
/*                   TELTREND INCORPORATED                            */
/*                    ALL RIGHT RESERVED                              */
/**********************************************************************/
/*apldet.c                                                            */
/**********************************************************************/
/*              APLICATION DETECTOR PROCESSING FOR UVG159             */
/********************************************************************  */
/* apl_detectors_processing:                                          */
/*This routine observes all the detector inputs and current configuration of */
/* the channel(relay status) and formats the right transmit signalling to */
/* send out to another end. It also control the busy LED in front pannel. */
/* In addition,whenever the channel goes off hook ,this module will start to */
/* schedule and set up to program the two combos for ALC              */
/**********************************************************************/ include <reg51.h>          /*Franklin 8051 resgister header file */
include <aportdf.h>        /*Aplication port definition header file */
#include <extern.h>         /*Module extern structure and rams file */
#include <avardef.h>        /*Aplication defined constant header file */
include <cvardef.h>        /*Core constant defined header file */ extern   apl_setup_slic_chip();
extern schedule_setup(char);/*Setup Combo auto gain loss */
extern void calculate_loss();
extern setup_to_program_combo();
extern reverse_bit_for_8051_serialbus(char);
extern  go_for_update_gain_on_hook();

void apl_detectors_processing()
{
idata char slic_status;
if(CGA_flag)
   {
       (*channel_pointer).new_tsig=ON_HOOK | EFG_bits_default;
       LED=IDLE;
       return;
   }
if((*channel_pointer).event_timer!=no_delay)
   {
       return;
   }
 slic_status=(*channel_pointer).out_to_slc;

/*Open Tip routine*/ if(slic_status==TIP_OPEN)
  {
       if(LOOP==loop_active_low)
       {
               (*channel_pointer).new_tsig=RING_GROUND | EFG_bits_default;
               LED=BUSY;
               ring_ground_flag=YES;
               go_for_update_gain_on_hook();
               return;
       }
       else
       {
               if(ring_ground_flag==YES && hold_ring_ground_flag==NO)
               {
                       hold_ring_ground_flag=YES;
                       (*channel_pointer).event_timer=delay_for_release_ring_ro
                       return;
               }
               else
               {
                       if(ring_ground_flag==NO)
                       {
                       (*channel_pointer).new_tsig=ON_HOOK | EFG_bits_default;
                       LED=IDLE;
                       go_for_update_gain_on_hook();
                       return;
                       }
               }
       }
   return;
   }
                /*Tip ground routine */
```

```
if(slic_status!=TIP_OPEN)
{
        if(ring_ground_flag==YES &&     hold_ring_ground_flag==NO)
        {
                hold_ring_ground_flag=YES;
                (*channel_pointer).event_timer=delay_for_release_ring_round;
                return;
        }
        if(LOOP==loop_active_low && ring_ground_flag==NO)
        {
          if(((*channel_pointer).tpcm_quiet_timer> spike_block_time)||
           ((*channel_pointer).tpcm_quiet_timer==EXPIRED))
           {
                        if(slic_status==RINGING)
                        (*channel_pointer).tpcm_quiet_timer=EXPIRED;
                        update_gain_on_hook=NO;
                        (*channel_pointer).new_tsig=OFF_HOOK | EFG_bits_default;
                        (*channel_pointer).out_to_slc=NORMAL;/*Set up for ring s
                        ring_trip_flag=YES;
                        TPCM_QUIET=NO;
                        LED=BUSY;
                        if(CHANNEL==A_channel)
                        {
                                C1A=LOW;
                                lca_rams_addr.A_out_put=common_output;
                        }
                        else
                        {
                                C1B=LOW;
                                lca_rams_addr.B_out_put=common_output;
                        }
           }
           apl_setup_slic_chip();
           if((*channel_pointer).off_hook_timer < max_count) DGAINLOSS=YES;
           else DGAINLOSS=NO;
           if(!DGAINLOSS && TEST_MODE==NO)
           {
            if(CHANNEL==A_channel && Bchannel_rams.gain_loss_scheduling
                                ==no_schedule)
            {
                        (*channel_pointer).gain_loss_scheduling +=1;
                        if((*channel_pointer).gain_loss_scheduling==5)
                        {
                        (*channel_pointer).gain_loss_scheduling=no_schedule;
                        return;
                        }
                        else
                        schedule_setup((*channel_pointer).gain_loss_scheduling);
            }
            if(CHANNEL==B_channel && Achannel_rams.gain_loss_scheduling
                        ==no_schedule)
            {
                        (*channel_pointer).gain_loss_scheduling +=1;
                        if((*channel_pointer).gain_loss_scheduling==5)
                        {
                        (*channel_pointer).gain_loss_scheduling=no_schedule;
                        return;
                        }
                        else
                         schedule_setup((*channel_pointer).gain_loss_scheduling)
            }
          }
        }
        else
        {
                if(ring_ground_flag==NO)
                {
                (*channel_pointer).new_tsig=ON_HOOK |  EFG_bits_default;
                LED=IDLE;
                (*channel_pointer).gain_loss_scheduling=0;
                go_for_update_gain_on_hook();
                }
        }
   }
}
/***************************************************************/
/*              UPDATE GAIN AND LOSS FOR ON HOOK                */
/***************************************************************/
```

```
extern code PROGCOMBO();
go_for_update_gain_on_hook()
{
unsigned char loss;
        loss=(*channel_pointer).on_hook_loss;
        (*channel_pointer).gain_loss_scheduling=no_schedule;
        if(DGAINLOSS)return;  /*check for disable auto gain loss */
        (*channel_pointer).off_hook_timer=set_to_zero;
        if(update_gain_on_hook==NO)
        {
                if(CHANNEL==A_channel)
                        lca_rams_addr.AB_control=schedule_for_A_pulse;
                else
                        lca_rams_addr.AB_control=schedule_for_B_pulse;
                if(TEST_MODE==YES)
                        {
                        xmt_gain=xmt_gain_test_mode;
                        rcv_gain=rcv_gain_test_mode;
                        if(SLIC==ERICKSON_SLIC){
                                BAL1VAL=test_mode_eric_bal1;
                                BAL2VAL=test_mode_eric_bal2;
                                BAL3VAL=test_mode_eric_bal3;
                        }
                        else{
                                BAL1VAL=test_mode_amd_bal1;
                                BAL2VAL=test_mode_amd_bal2;
                                BAL3VAL=test_mode_amd_bal3;
                        }
                        }
                else/*Normal Mode*/
                        {
                        if((loss < val_1_5db || loss==val_1_5db))
                        {
                                xmt_gain=xmt_gain_1quadrant_for_on_hook;
                                rcv_gain=rcv_gain_1quadrant_for_on_hook;
                                BAL1VAL=bal1_1quadrant_for_on_hook;
                        }
                        if((loss >= val_1_5db) && (loss < val_3_0db))
                        {
                                xmt_gain=xmt_gain_2quadrant_for_on_hook;
                                rcv_gain=rcv_gain_2quadrant_for_on_hook;
                                BAL1VAL=bal1_2quadrant_for_on_hook;
                        }
                        if((loss > val_3_0db)||( loss==val_3_0db))
                        {
                                xmt_gain=xmt_gain_3quadrant_for_on_hook;
                                rcv_gain=rcv_gain_3quadrant_for_on_hook;
                                BAL1VAL=bal1_3quadrant_for_on_hook;
                        }

}
        rcv_gain=~rcv_gain;
        rcv_gain=reverse_bit_for_8051_serialbus(rcv_gain);
        xmt_gain =~xmt_gain;
        xmt_gain=reverse_bit_for_8051_serialbus(xmt_gain);
        PROGCOMBO();
        update_gain_on_hook=YES;
        }
}
```

A preferred embodiment of the present inventions has been described herein. It is to be understood, of course, that changes and modifications may be made in the preferred embodiment without departing from the true scope and spirit of the present invention, as defined by the appended claims.

We claim:

1. A hybrid converter system for use with a digital transmission line system, said system including a customer loop telephone line, interconnected to a telephone, and receive and transmit digital carrier transmission lines, comprising, in combination:

a digital to analog converter for converting a receive digital data signal from said receive digital carrier transmission line to a receive analog signal;

a hybrid converter, for accepting said receive analog signal and transmitting said receive analog signal to said customer loop telephone line, and for accepting a transmit analog telephone signal from said customer loop telephone line and transmitting said transmit analog telephone signal to a summing circuit, said hybrid converter including an inverter for inverting said receive analog signal and said transmit analog telephone signal with respect to each other, a variable amplifier for variably adjusting said receive analog signal and providing an adjusted signal, said variable amplifier providing higher and lower adjusted signals in response to a control signal, and said summing circuit accepting said transmit analog telephone signal and said adjusted signal and providing a combined signal to an analog to digital converter, said analog to digital converter for converting said combined signal to a transmit digital data signal on said transmit digital carrier transmission line;

an interface circuit for sensing direct current in said telephone line and providing an off hook signal when said telephone goes off hook; and a microprocessor, interconnected to said variable amplifier and interface circuit, said microprocessor receiving said off hook signal from said interface circuit and providing said control signal to said variable amplifier, causing said variable amplifier to produce said lower level adjusted signal upon said telephone going off hook.

2. A hybrid system converter for use with a digital transmission line system, said system including a customer loop telephone line, interconnected to a telephone, and receive and transmit digital carrier transmission lines, comprising, in combination:

a digital to analog converter for converting a receive digital data signal from said receive digital carrier transmission line to a receive analog signal;

a hybrid converter, for accepting said receive analog signal and transmitting said receive analog signal to said customer loop telephone line, and for accepting a transmit analog telephone signal from said customer loop telephone line and transmitting said transmit analog telephone signal to a summing circuit, said hybrid converter including an inverter for performing an inversion by inverting said receive analog signal and said transmit analog telephone signal with respect to each other, said receive analog signal and said transmit analog telephone signal defining regulated signals, a variable amplifier for variably adjusting one of said regulated signals and providing an adjusted signal, said variable amplifier providing a changed adjusted signal in response to a control signal, said summing circuit accepting said transmit analog telephone signal and said adjusted signal, after said inversion, and providing a combined signal to an analog to digital converter, said analog to digital converter for converting said combined signal to a transmit digital data signal on said transmit digital carrier transmission line;

an interface circuit for sensing direct current in said telephone line and providing an off hook signal when said telephone goes off hook; and a controller, interconnected to said variable amplifier and interface circuit, said controller receiving said off hook signal from said interface circuit and providing said control signal to said variable amplifier, causing said variable amplifier to produce said adjusted signal upon said telephone going off hook.

3. A hybrid circuit as claimed in claim 2 wherein said hybrid converter further comprises a programmable receive amplifier for amplifying said analog receive signal and for responsively producing an amplified receive signal and wherein said amplified receive signal further defines one of said regulated signals.

4. A hybrid circuit as claimed in claim 3 further comprising an analog to digital converter for accepting said combined signal from said summing circuit and responsively providing a digital data signal to said transmit digital carrier transmission line.

5. A hybrid circuit as claimed in claim 4 wherein said hybrid converter further comprises a programmable transmit amplifier for amplifying said combined signal from said summing circuit for said analog to digital converter.

* * * * *